United States Patent [19]

Tsukamoto et al.

[11] Patent Number: 5,369,688
[45] Date of Patent: Nov. 29, 1994

[54] DATA COMMUNICATION APPARATUS WITH INTERRUPT COMPLETION DETECTING

[75] Inventors: Kazuyuki Tsukamoto; Minoru Yoshida; Ryuji Hosaka; Tomoo Fukao; Naoharu Kido; Naoki Suto, all of Saitama, Japan

[73] Assignee: Fuji Xerox Co., Ltd., Tokyo, Japan

[21] Appl. No.: 774,196

[22] Filed: Oct. 10, 1991

[30] Foreign Application Priority Data

Jan. 16, 1991 [JP] Japan .................. 3-014915

[51] Int. Cl.5 .......................................... H04M 11/00
[52] U.S. Cl. ..................... 379/100; 379/215; 358/437
[58] Field of Search ............... 379/100, 209, 215, 157, 379/102, 104, 105, 96, 97, 98, 94, 93; 358/434, 435, 436, 437

[56] References Cited

U.S. PATENT DOCUMENTS

| | | | |
|---|---|---|---|
| 4,991,203 | 2/1991 | Kakizawa | 379/209 |
| 4,995,073 | 2/1991 | Okata et al. | 379/100 |

*Primary Examiner*—Curtis Kuntz
*Assistant Examiner*—Stella L. Woo
*Attorney, Agent, or Firm*—Finnegan, Henderson Farabow, Garrett & Dunner

[57] ABSTRACT

When an interrupt completion detecting unit detects completion of an interrupt processing, a hooking unit executes hooking automatically. A busy tone detecting unit judges whether or not a station of a suspended telephone communication has been holding the telephone circuit. If not, a call is directed to the suspended station on the basis of stored information on its dialing number. At the same time as the hooking is executed, an on-hook judging unit judges whether or not a handset at the own station is in an on-hook state. If it is on the hook, a predetermined processing for urging an operator to lift the handset is executed. This processing selectively causes ringing of a bell incorporated in a telephone unit or of a buzzer, or indication by a display unit or a lamp. With the above procedure, the telephone communication with the suspended station can automatically be restored in accordance with the situations at the suspended and own stations.

4 Claims, 3 Drawing Sheets

DATA COMMUNICATION APPARATUS WITH INTERRUPT COMPLETION DETECTING

BACKGROUND OF THE INVENTION

The present invention relates to a data communication apparatus and, more particularly, to a data communication apparatus equipped with an oral communication means and improved in processing a connection request coming from another station during communication therewith using the oral communication means.

Among data communication apparatuses such as a facsimile apparatus and a personal computer, there exists a type which has an oral communication means (i.e., a telephone unit) separately from the data (e.g., image information) communication means. In this type of data communication apparatus, it is possible to call an operator at a station to exchange necessary information using the oral communication means in advance of transmission of data, e.g., image information. It is, of course, also possible to only converse by use of the oral communication means irrespective of the necessity of transmitting data.

Recently, a new communication service (hereinafter referred to as "catch phone" service) has been put into practice, in which when a conversation request or a data transmission request is made from another station during communication with one station, and the user is informed of this fact by a sound sent from an exchange.

When the user hears calling tones of the catch phone service sent from the exchange during oral communication, he verbally informs the person under communication that the catch phone call has come in, to hold the communication, and then executes a data receiving operation to receive data from the second station.

However, conventional data communication apparatuses do not have a function of automatically switching the telephone circuit to the previously communicated station to re-start the conversation upon completion of the data reception by an interrupt processing caused by the catch phone call. Accordingly, upon completion of the data reception, the circuit is released, and the user cannot make a conversation with the person at the previously communicated station.

To overcome this problem, various apparatuses and systems have been proposed which are adapted to restore the communication with the previously communicated station after executing communication of the catch phone service or an interrupt processing similar to it.

Japanese Patent Application Laid-Open Nos. Sho. 63-67868 and Sho. 64-86660 respectively disclose a facsimile communication system and a data communication system in which when an interrupt instruction is given by an operator or received from another station during transmission of image information, the current transmission of image information is suspended to execute the instructed interrupt processing, and after completion of the interrupt processing the transmission of image information is resumed automatically.

Further, Japanese Patent Application Laid-Open No. Sho. 64-78575 discloses a facsimile apparatus which is constructed such that if transmission is suspended due to some trouble, the stored telephone number is dialed to transmit the image information stored in an image signal memory unit.

Further, in a facsimile apparatus disclosed in Japanese Patent Application Laid-Open No. Hei. 2-51973, when a connection request (catch phone call) comes in from another station during communication with one station, the current communication is temporarily held. During this temporary holding period, the identification information (telephone number) of the station of the catch phone call is stored, and the communication being held is restored. Upon completion of this communication, the station of the catch phone call is called using the stored telephone number.

However, the prior art techniques disclosed in the above publications have the following problems.

In the above prior art techniques, the communication concerned is not an oral communication between persons, but a data communication between machines such as facsimile apparatuses. In the case of such communication between machines, even if it is held or suspended due to reception of a catch phone call, it is guaranteed that the communication holding or suspension state is maintained by the machine. Accordingly, it is easy to automatically restore the communication with the previously communicated station by executing a proper processing after completion of the interrupt data communication.

On the other hand, when oral communication using an oral communication means, i.e., a telephone unit attached to a data communication apparatus is held due to a data transmission request, it is not guaranteed that the person at the previously communicated station will stand by during the data reception. The person may hang up the handset for some reason, or may stand by as desired during the data reception.

Processings to be executed after completion of the data reception, i.e., after the interruption, are different depending on which of the above two cases applies. For example, if the person at the previously communicated station has hung up the handset, it is necessary to call him again, whereas if he stands by, the circuit is restored simply by a hooking operation.

Further, there is a possibility that the operator at the station will leave the telephone unit in spite of the restoration of the circuit by, e.g., the automatic calling.

Thus, the conventional apparatuses do not fully consider a variety of situations in the communication involving persons, and hence do not take advantage of the catch phone service sufficiently.

SUMMARY OF THE INVENTION

An object of the present invention is to provide a data communication apparatus in which, when a data transmission request is made during telephone communication, the communication is temporarily held to receive the requested data, and thereafter the user can smoothly resume the conversation with the previously communicated station in accordance with the situation at that time point.

According to the invention, a data communication apparatus comprises means for detecting completion of reception of data sent from a second station which interrupted telephone communication between a first station and a home station, and for outputting a hooking signal upon the completion of the data reception.

Means are provided for performing hooking in response to the hooking signal, to cause switching from a second telephone circuit for communication with the second station to a first telephone circuit for communication with the first station. Means are provided for detecting busy tones to be received in response to the hooking, the busy tones indicating that the first station has released the first telephone circuit. Means are provided for releasing the first telephone circuit in response to the detection of the busy tones.

Further, there may be provided means for automatically initiating a call to the first station based on its stored dialing number, after the release of the first telephone circuit.

Means may also be provided for notifying, in response to the hooking, an operator at the home station that a telephone unit at the home station is in an on-hook state.

DESCRIPTION OF THE PREFERRED EMBODIMENT

The present invention will be described below in detail with reference to the accompanying drawings.

Figure 2:
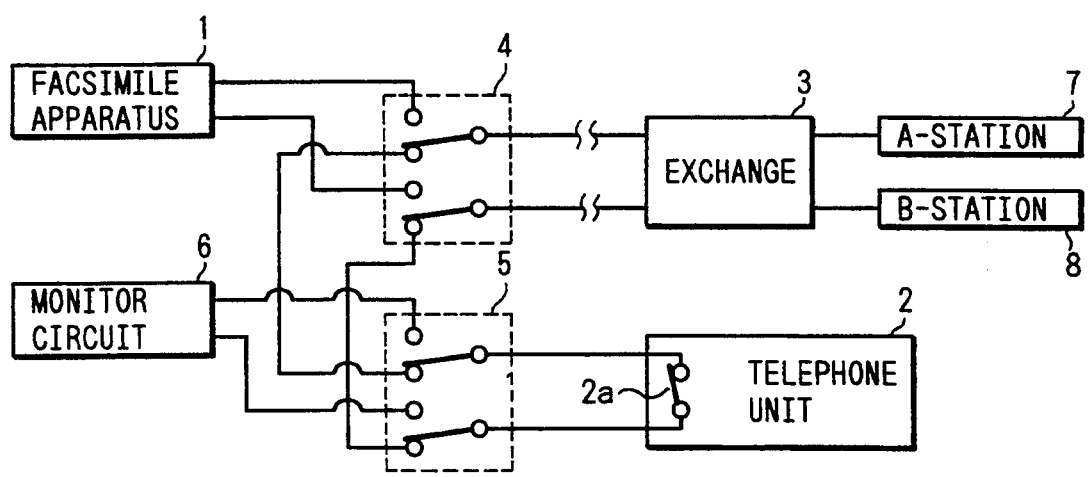
FIG. 2 is a block diagram of a facsimile system for explanation of a hooking operation.

First, a hooking operation for answering a catch phone call will be explained. FIG. 2 shows a circuit of a facsimile system for explanation of the hooking operation.

Referring to FIG. 2, a facsimile apparatus 1, a telephone unit 2 attached thereto, and an exchange 3 are interconnected via a first relay 4 and a second relay 5. In the illustrated state, the relays 4 and 5 are switched to connect the exchange 3 and the telephone unit 2. Control signals for switching the relays 4 and 5 are supplied from a control unit (not shown).

If, in the illustrated state, a connection request comes in from a B-station 8 during telephone communication with an A-station 7 by use of the telephone unit 2, a catch phone signal is sent from the exchange 3 to the telephone unit 2. The catch phone signal is an intermittent signal of 400 Hz, which is audible to an operator who is in telephone communication. Hearing this sound, the operator can recognize that the connection request has come in from another station. Then, the operator performs a hooking operation of just hanging up the handset for an instant. By this operation, a contact 2a of the telephone unit 2 is opened for an instant, and the exchange 3 detects instantaneous release of the telephone circuit caused by this opening of the contact 2a.

Detecting the hooking from the instantaneous release of the circuit, the exchange 3 switches the circuit from the A-station 7 to the B-station 8. If the B-station 8 is a facsimile apparatus, the operator again performs the hooking operation to switch the circuit to the A-station 7 and asks the A-station 7 to hold the circuit. Thereafter, the operator again performs the hooking operation to switch the circuit to the B-station 8, and then instructs the facsimile apparatus 1 from, e.g., an operating panel (not shown) to receive image data. In response to the instruction of the operator, switching signals to switch the first relay 4 and second relay 5 to the side opposite to the illustrated side are supplied from the control unit, so that the B-station 8 and the facsimile apparatus 1 are connected to each other.

Upon completion of the reception of image information by the facsimile apparatus 1, the control unit supplies a signal to the first relay 4 to open it, to effect an automatic hooking operation. Detecting an instantaneous disconnection of the circuit caused by this hooking operation, the exchange 3 switches the circuit from the B-station 8 to the A-station 7.

In this way, the exchange 3 switches the circuit upon detecting the hooking operation. When the circuit is switched to the A-station 7, the control unit switches the first relay 4 and second relay 5 to the telephone unit side, thereby connecting the telephone unit 2 and the A-station 7.

A monitor circuit 6 monitors whether the telephone unit 2 is in an on-hook state where the handset is hung up or in an off-hook state where it is not, from the open/closed state of the contact 2a. The function of the monitor circuit 6 will be described later in more detail. It should be noted that the switching of the telephone circuit that is executed in response to the hooking operation is a well-known operation that is carried out as part of the catch phone service.

By virtue of the above construction, the operator can resume the conversation with a person at the A-station 7 after completion of the interrupt operation caused by the catch phone call. However, if the person at the A-station 7 has hung up due to some reason which prevented him from waiting for completion of the interrupt operation, the circuit cannot be connected to the A-station 7 in spite of the performance of the hooking operation. Further, it may be the case that although the circuit is successfully connected to the A-station 7, the operator may be away from the home station, i.e., the station of the telephone unit 2.

Thus, it is necessary that an appropriate interrupt post-processing be done in accordance with the situations at the home station and the other station (i.e., A-station Interrupt post-processings to be executed in accordance with each particular situation will be explained next.

Figure 3:
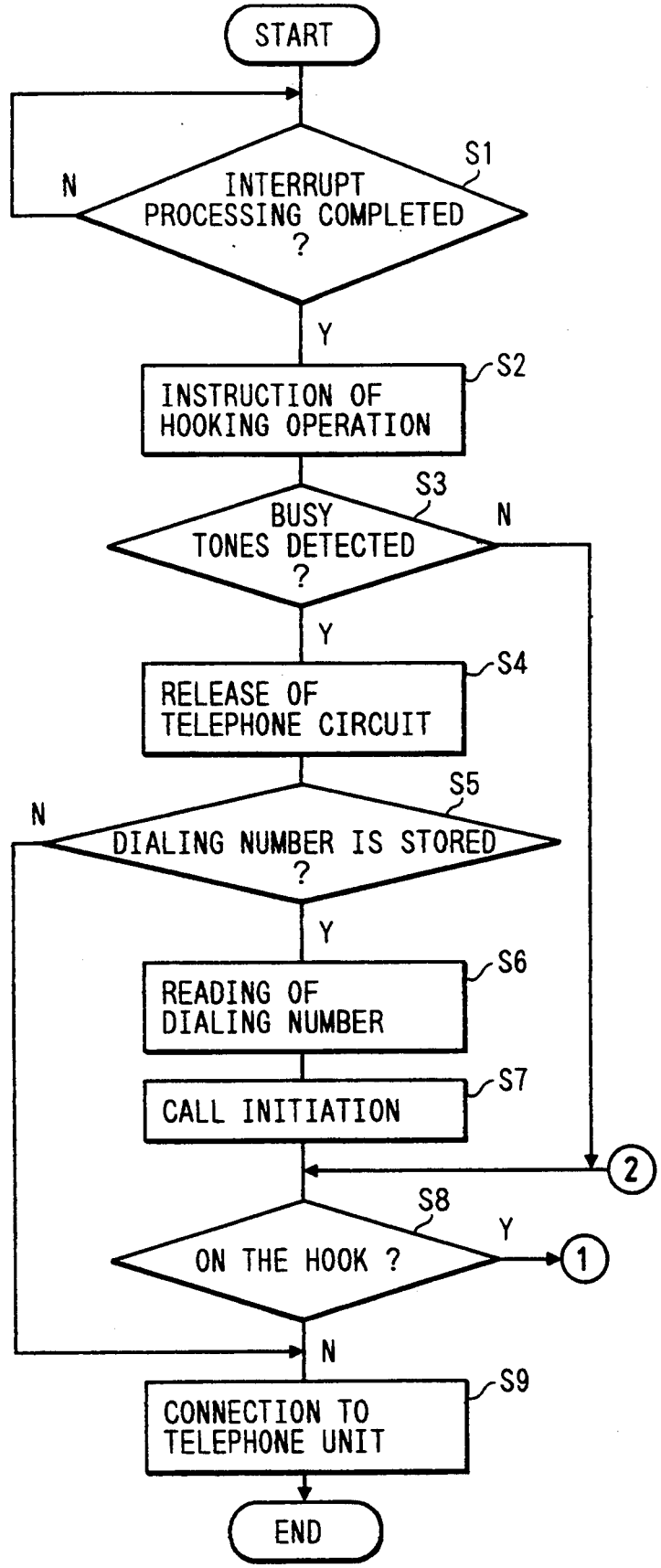
FIGS. 3 and 4 include a flowchart of an interrupt post-processing.
Figure 4:
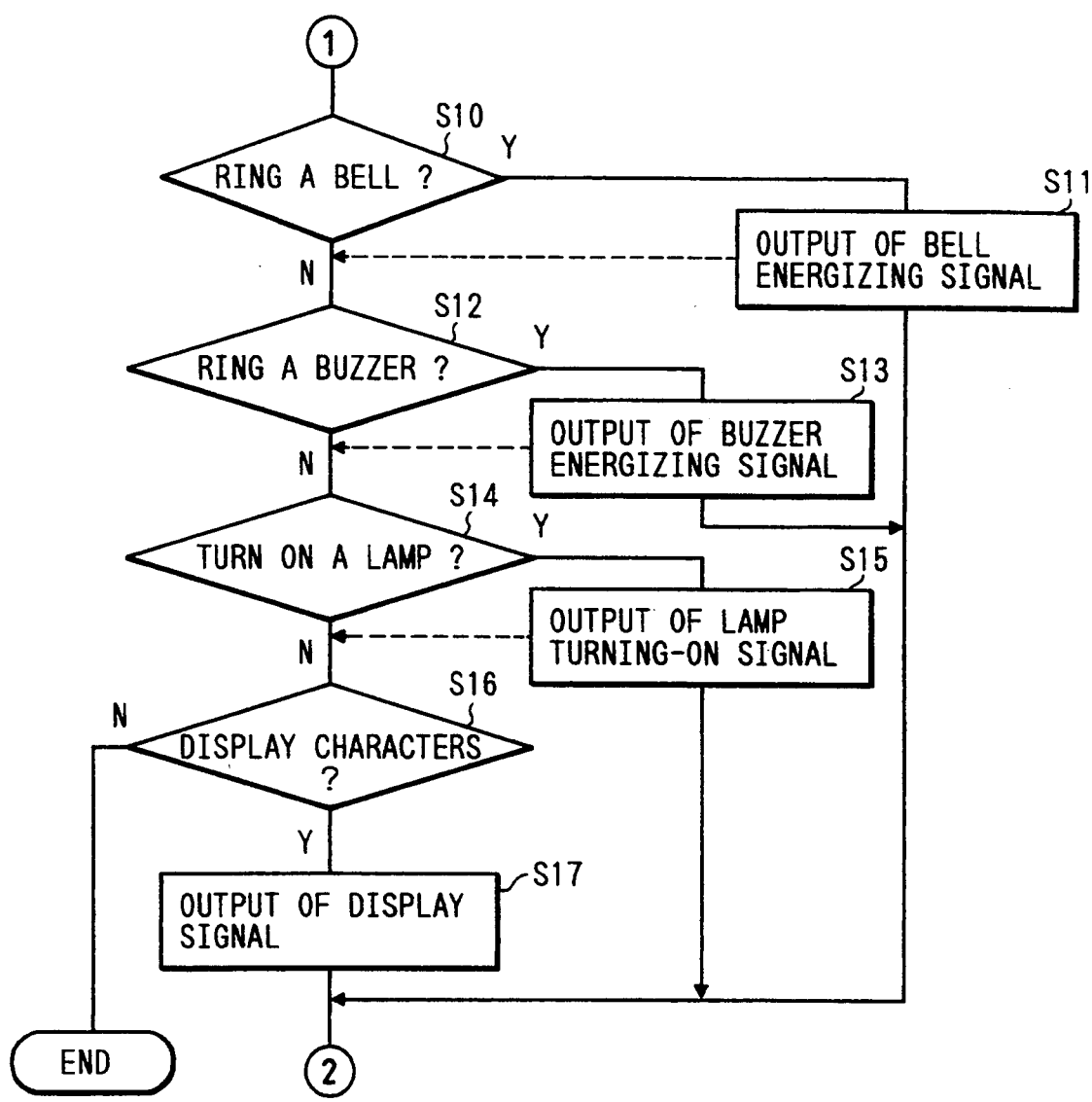

A flowchart of FIG. 3 and 4 shows an interrupt post-processing.

Referring to FIG. 3, it is judged in Step S1 whether or not an interrupt processing, i.e., reception of image data has been completed. This judgement is made on the basis of a circuit disconnection signal DNC sent from an interrupt station (i.e., B-station 8). If it is judged that the interrupt processing has been completed, the process proceeds to Step S2.

In Step S2, an instruction signal to cause a hooking operation is output, in response to which the first relay 4 is opened momentarily.

It is judged in Step S3 whether or not busy tones have been detected. When the exchange 3 switches the circuit from the B-station 8 to the A-station 7 in response to the hooking, if the handset at the A-station 7 is hung up, the circuit is not connected to the A-station 7 and the exchange 3 generates the busy tones. In other words, it is judged in Step S3 whether or not the A-station 7 is holding the circuit based on whether or not the busy tones have been detected.

If the busy tones have been detected, the process proceeds to Step S4, where the circuit is released.

It is judged in Step S5 whether or not the dialing number of the A-station 7 is stored. This dialing number is the one which was input to initiate the call to the A-station 7, and which was stored in a memory unit at that time. It should be noted that in the case of communication performed through an ISDN network, the dialing number of a calling station can be recognized by the called-party station on the basis of the dialing number information sent from an exchange. Accordingly, in such a case, the dialing number information sent out from the exchange can be stored in a memory unit.

If the judgement made in Step S5 is affirmative, the dialing number stored in the memory unit is read out in Step S6, and then sent out (i.e., a call is initiated) to the circuit in Step S7.

If the judgement in Step S3 is negative, which means that the A-station 7 has been holding the circuit and waiting, the process proceeds to step S8, skipping Steps S4–S7.

In Step S8, it is judged whether or not the operator at the home station is near the facsimile apparatus 1 and is able to resume the conversation. This judgement is actually made by judging from a detection signal of the monitor circuit 6 whether or not the handset is on the hook.

If the handset is not on the hook, which means that the operator at the home station can resume the communication with the A-station 7 immediately, the process proceeds to Step S9, where the relays 4 and 5 are switched to connect the telephone unit 2 and the circuit. Thus, the interrupt post-processing is finished.

On the other hand, if the judgement in Step S8 is affirmative, it is known that the operator at the home station is not prepared for communication, though the A-station 7 is being called or already connected to the circuit. Therefore, Step S10–S17 of FIG. 4 are executed to urge the operator at the home station to lift the handset.

Referring to FIG. 4, it is first judged in Step S10 from a preset instruction whether to ring a bell of the telephone unit 2. If the judgement is affirmative, the process proceeds to Step S11, where a bell energizing signal is output. The bell energizing signal is a signal of 16 Hz based on the same standards as those for a signal supplied as a telephone call signal from a telephone company (e.g., Nippon Telegraph & Telephone Company).

Where it has not been set to ring the bell, the process proceeds from Step S10 to Step S12, where it is judged from a preset instruction whether to ring a buzzer to urge the operator. If the judgement is affirmative, the process proceeds to Step S13, where a buzzer energizing signal is output. The buzzer may be one which is provided in the facsimile apparatus 1, and may be based on any specifications. Therefore, the buzzer energizing signal may be in any form, too.

Where it has not been set to ring the buzzer, the process proceeds from Step S12 to Step S14, where it is judged from a preset instruction whether to turn on a lamp to urge the operator to lift the handset. If the judgement is affirmative, the process proceeds to Step S15, where a signal is output to turn on the lamp to urge the operator to lift the handset.

Where it has not been set to turn on the lamp, the process proceeds from Step S14 to Step S16, where it is judged from a preset instruction whether to urge the operator to lift the handset by displaying letters. If the judgement is affirmative, the process proceeds to Step S17, where a signal is output to display, on a display unit, letters urging the operator to lift the handset. The display unit is provided on the control panel of the facsimile apparatus 1, for example.

If the judgement in Step S16 is negative, the process is finished.

After one of the bell energizing signal, buzzer energizing signal, the lamp turning-on signal and the display signal is output, the process returns to Step S8, where it is again judged whether or not the handset is on the hook. In other words, a judgement is made as to whether or not the operator has responded to a sign produced in response to one of the above-described signals.

Although, in the above example, one of the ringing of the bell or the buzzer, turning-on of the lamp, and display of letters is selectively executed, the invention is not limited thereto, but all or any combination of the means for urging the operator to lift the handset may be executed, as shown by the broken lines in FIG. 4. In the latter case, the procedure needs to be modified accordingly.

Figure 1:
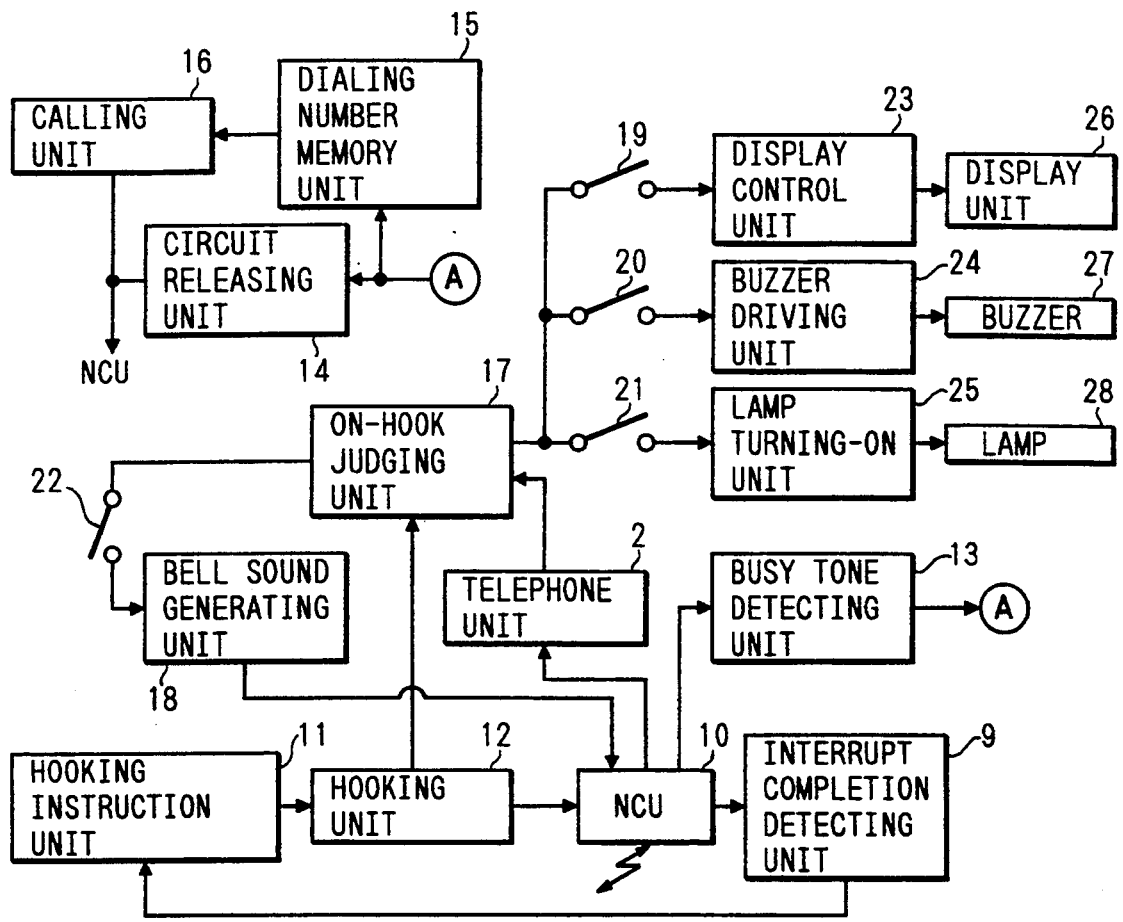
FIG. 1 is a block diagram showing essential functions of a control unit according to an embodiment of the present invention.

The functions of the control unit for executing the above-described interrupt post-processing will be explained next. FIG. 1 is a block diagram showing essential functions of the control unit.

Referring to FIG. 1, an interrupt completion detecting unit 9 constantly monitors a protocol signal that is provided from a circuit control unit (NCU) 10, to detect a circuit disconnection signal DCN sent from a station under communication. When it is detected from the circuit disconnecting signal DCN that transmission of image data from the other station has been completed, a hooking instruction unit 11, responding to a detection signal supplied from the interrupt completion detecting unit 9, provides a hooking instruction signal to a hooking unit 12. The hooking unit 12 executes an instantaneous opening of the circuit in response to the hooking instruction signal to inform, via the NCU 10, the exchange 3 of the hooking. The hooking unit 12 is a means for opening the first relay 4 (see FIG. 2) for an instant.

A busy tone detecting unit 13 detects busy tones that are sent from the exchange 3 in response to the hooking in the case where a previously communicated station has released the circuit. A circuit releasing unit 14 provides a circuit releasing signal to the NCU 10 in response to the busy tone detecting signal supplied from the busy tone detecting unit 13.

A dialing number memory unit 15 is a means for storing a dialing number of the station with which communication was made before the start of the interrupt processing. The dialing number is input from the operating unit at the time of starting the communication with that station by initiating a call. The dialing number stored in the dialing number memory unit 15 is provided to a calling unit 16 in response to the busy tone detecting signal supplied from the busy tone detecting unit 13. The calling unit 16 initiates a call via the NCU 10 based on the dialing number.

An on-hook judging unit 17 is a means for judging from an output signal of the monitor circuit 6 (see FIG. 2) whether or not the telephone unit 2 is in an on-hook state. The on-hook judging unit 17 outputs the result of the judgement in response to the hooking executed after the interrupt processing. The judgement result is supplied to one of a display control unit 23, a buzzer driving unit 24, a lamp turning-on unit 25 and a bell sound generating unit 18, via a closed one of associated selection switches 19–22. The display control unit 23, buzzer driving unit 24, lamp turning-on unit 25 and bell sound generating unit 18 output signals for respectively instructing a display unit 26, a buzzer 27, a lamp 28 and a bell incorporated in the telephone unit 2 to effect a desired display or indication while the on-hook state is being detected by the on-hook judging unit 17. The closure or opening of the selection switches 19 to 22 can be set in advance by the operator as desired.

The output of the bell sound generating unit 18 is provided to the telephone unit 2 via the NCU 10.

Thus, in the above embodiment, the hooking signal is output after completion of the interrupt processing, and then the circuit connecting condition of the previously communicated station and the condition of the handset at the home station are judged. If the circuit to the previous station has been disconnected, the circuit to the home station is temporarily released and thereafter the previous station is called. In addition, if necessary, the operator at the home station is urged to prepare for telephone communication.

Although in the above embodiment the selection switches 19–22 are provided for selectively energizing the display unit 26, the buzzer 27, the lamp 28 and the bell of the telephone unit 2 as means for requesting the operator to lift the handset when it is on the hook, it is possible to provide only desired one or ones of the above means.

Although the above embodiment was described for such a case that image data is received by a facsimile apparatus by interrupting a telephone conversation, it is, of course, possible to execute a processing in the same way as in the embodiment even where the interrupt request by a catch phone call is for a data reception processing from other type of data communication apparatus, e.g., a personal computer.

As is understood from the foregoing description, according to the invention, it is possible not only to automatically carry out interrupt communication caused by a catch phone call received during telephone communication, but also to automatically restore the communication with the previously communicated station by executing hooking upon completion of the interrupt communication.

In resuming the telephone communication, an interrupt post-processing can be executed in accordance with the situations at the previously communicated station and the home station. More specifically, if the other party has already released the circuit, a call to that station can be automatically initiated on the basis of stored information on its dialing number, whereas if the handset at the home station is on the hook, the operator can be urged to lift it.

What is claimed is:

1. A data communication apparatus comprising:
    a home station having a home telephone connected through a first telephone circuit to a first telephone of a first station;
    means for outputting a hook signal upon detection of completion of data transmission from a second station to the home station through a second telephone circuit after the second station has interrupted telephone communication between the home telephone and the first telephone through the first telephone circuit;
    means for switching from the second telephone circuit to the first telephone circuit in response to the hook signal;
    means for detecting a first station busy tone after switching to the first telephone circuit; and
    means for releasing the first telephone circuit when the first station busy tone is detected.

2. The apparatus according to claim 1, further comprising:
    means for storing a dialing number of the first station at the time of first initiating a call to the first station from the home station; and
    means for initiating a call from the home station over the first telephone circuit to the first station based on the stored dialing number after the first telephone circuit is released by the releasing means.

3. The apparatus according to claim 1, further comprising:
    means for judging, in response to the hook signal, whether the home telephone is in an on-hook state; and
    means for notifying the on-hook state when the judging means has judged that the home telephone is in the on-hook state.

4. A data communication apparatus comprising:
    a home station;
    means for detecting completion of reception of data sent to the home station from a second station which interrupted telephone communication between a first station and the home station, and for outputting a hooking signal upon the completion of the data reception;
    means for detecting, after the output of the hooking signal, whether busy tones are being received from the first station; and
    means for releasing the first telephone circuit if it is detected that the busy tones are being received.

* * * * *